W. L. BLISS.
ELECTRIC REGULATOR.
APPLICATION FILED AUG. 21, 1911. RENEWED JULY 28, 1916.
1,197,178.
Patented Sept. 5, 1916.
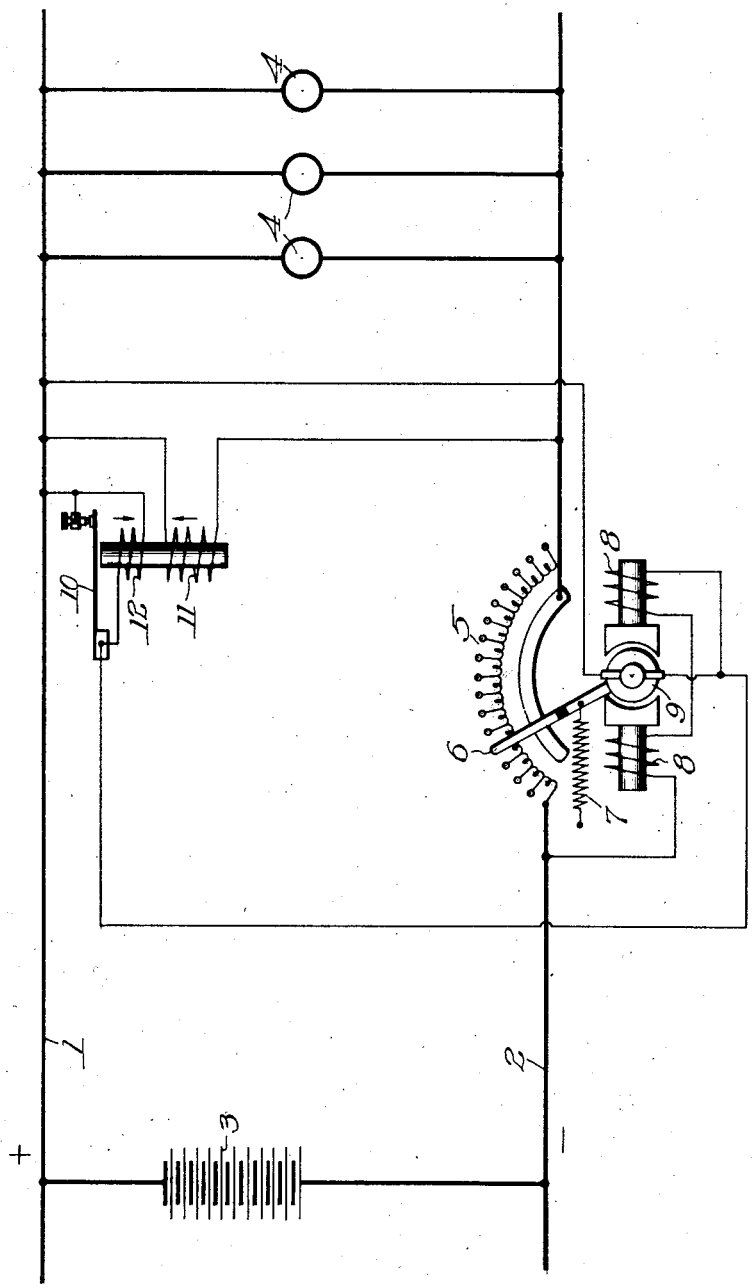

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ELECTRIC REGULATOR.

1,197,178.      Specification of Letters Patent.      Patented Sept. 5, 1916.

Application filed August 21, 1911, Serial No. 645,228. Renewed July 28, 1916. Serial No. 111,958.

*To all whom it may concern:*

Be it known that I, WILLIAM L. BLISS, a citizen of the United States, residing at Niagara Falls, in the county of Niagara and State of New York, have invented new and useful Improvements in Electric Regulators, of which the following is a full, clear, concise, and exact description, reference being had to the accompanying drawing, forming a part of this specification.

My invention relates to an electric regulator and to a system of distribution employing such a regulator.

One of the objects of my invention is to provide a regulator which shall be positive and stable in operation, and which shall regulate within close limits.

Another object is to provide a motor-operated regulator, the energization of the motor armature being varied in response to variations in the electrical conditions of the circuit to be regulated.

A further object is to provide a voltage regulator comprising a rheostat operated by a motor, the energization of whose armature is controlled by rapidly opening and closing a shunt circuit around said armature at a rate responsive to voltage variations in the circuit to be regulated.

The regulator may be embodied in various forms, and may be employed in various systems. For the purpose of illustrating the principles of the invention, I have illustrated one form of regulator as applied to the lamp circuit of a car-lighting system.

It is obvious that the regulator may be constructed in various forms and can be used to regulate the field winding of a generator, or it could be used in various other relations.

The drawing illustrates diagrammatically the embodiment of the invention referred to.

In the diagram, the mains 1—2 are adapted to be supplied by any suitable source of electrical energy, such as an axle-driven generator (not shown). The storage battery 3 and translating devices 4 are connected across the mains in parallel branches. Under certain conditions the translating devices are adapted to be supplied by the storage battery alone, and under other conditions the translating devices and the battery may both be supplied with current from the generator.

In order to prevent an excessive voltage from being impressed on the translating devices, which are herein illustrated as lamps, and in order to maintain a constant voltage on said lamps, a variable resistance 5 is connected in circuit between said battery and said lamps. The variable resistance is illustrated as a rheostat having a movable arm 6 adapted to be moved over the successive contacts, in the well known manner, and normally held in initial position by a spring 7, in which position the resistance of the rheostat is a minimum. The contact arm 6 may be moved back and forth to compensate for any rise in voltage above a predetermined normal value, which rise would otherwise be impressed on the lamps. This arm is adapted to be moved by a series motor, in the present instance, the motor being provided with field windings 8 connected permanently across the circuit 1—2, and an armature 9 in series with said field windings. The field windings 8 are connected across the circuit between the storage battery and the rheostat 5, so as to respond to whatever voltage is impressed on said rheostat. The armature 9, being connected in series with the field windings 8, is also connected across the circuit 1—2, but is normally short-circuited by a vibrating contact device 10 connected in a shunt circuit around said armature. The vibrating contact device may assume various forms, and is illustrated as the well known resilient reed type. The reed is adapted to vibrate rapidly under certain conditions in response to the energization of the voltage responsive winding 11 connected across the circuit between the rheostat 5 and the lamps 4, so as to respond to whatever voltage variations tend to be impressed on said lamps. An auxiliary high speed coil 12 is associated with said winding 11, and acts differently to compensate for the varying reluctance of the air gap between the core of said winding and the resilient reed, which acts as the armature. Said high speed coil is normally short-circuited by the reed, but is energized whenever the reed is drawn down and opposes the coil 11, thereby permitting the reed to spring back quickly. The high speed coil has a high resistance, and thereby does not divert any appreciable amount of current from the motor armature when the resilient reed is drawn down.

The operation of the system is substantially as follows: Upon any tendency toward an increase of voltage above the normal value which it is desired to impress on the translating devices, the increased energization of the coil 11 causes the resilient reed to be drawn down, thereby opening the short circuit around the motor armature and thereby admitting the armature into circuit. As the motor field is continuously energized, the armature tends to rotate in a direction to cut resistance into the circuit. The increased resistance of the circuit causes a decrease in the energization of the coil 11, thereby permitting the resilient reed to spring back and again short-circuit the armature. This action is accelerated by the high speed coil, as explained above. If the tendency toward increasing voltage continues, the above cycle of operation is repeated rapidly, the reed vibrating at a rapid rate and controlling the mean energization of the armature winding, whereby said armature tends to move the rheostat arm 6 against the action of the spring 7. As a result, the arm tends to maintain whatever position is required to hold the voltage impressed across the lamps substantially constant. Of course, the motor armature may either move the rheostat arm directly or through a train of gears.

It is apparent that the above embodiment of the invention was selected for the purpose of illustration only, and therefore I do not desire to limit myself to said embodiment, as other forms may be devised which accomplish the desired results and fall within the scope of the appended claims.

What I claim as new and desire to secure by Letters Patent is:

1. An electric regulator comprising a variable resistance, a plurality of electromagnetic windings which by mutual reaction control said variable resistance, a shunt circuit adapted to be closed around one of said windings and a vibrating contact for controlling said shunt circuit whereby the energization of said winding is regulated.

2. In combination with a circuit to be regulated, an electric regulator therefor, said regulator including a regulating medium, a plurality of coöperating electromagnetic windings for controlling said medium, a shunt circuit adapted to be closed around one of said windings and a regulating coil for controlling said shunt circuit to regulate the energization of said winding, another of said electromagnetic windings being permanently connected across the circuit to be regulated.

3. An electric regulator comprising a regulating medium, a motor for controlling said medium, a shunt circuit adapted to be closed around the armature of said motor and a regulating coil for controlling said shunt circuit, thereby regulating the energization of said armature.

4. An electric regulator, comprising a variable resistance, a motor for controlling said variable resistance, separable contacts connected in a shunt circuit around the motor armature to control the energization of said armature, and a regulating coil adapted to cause rapid vibration of one of said contacts to open and close said shunt circuit at a rapid rate.

5. A circuit to be regulated and an electric regulator therefor, said regulator including a variable resistance in the circuit to be regulated, a motor for controlling said resistance, a shunt circuit adapted to be closed around the armature of said motor but not around the field thereof, a vibrating contact adapted to coöperate with a stationary contact to open and close at a rapid rate said shunt circuit around the motor armature, and a voltage responsive winding for controlling said vibrations, whereby said motor field is permanently energized, and whereby the mean energization of said motor armature responds to variations in the voltage of the circuit.

6. An electric regulator, comprising, in combination, a variable resistance adapted to be connected in the circuit to be regulated, a motor for varying said resistance, a shunt circuit adapted to be closed around the armature of said motor, short-circuiting contacts adapted to control said shunt circuit around the motor armature, and a voltage responsive winding for controlling the action of said contacts.

7. An electric regulator, comprising, in combination, a rheostat, a motor for operating said rheostat, a shunt circuit adapted to be closed around the armature of said motor, a vibrating contact coöperating with a fixed contact to rapidly open and close said shunt circuit around the motor armature, a voltage responsive winding controlling said vibrations, and a high speed coil coöperating with said winding.

8. In an electric regulator, in combination, a rheostat having a movable arm, a spring normally holding said arm in a position to cut out all of the resistance, a series motor for operating said rheostat arm, a short circuit adapted to be closed around the armature of said motor, separable contacts for controlling said short circuit around the motor armature, a voltage responsive winding for controlling said short circuit and, hence, for controlling the mean energization of the motor armature, whereby said armature moves said rheostat arm to insert resistance in circuit proportional to the voltage rise effective in said voltage winding, and an auxiliary coil associated with said voltage winding for increasing the sensitiveness of the regulation.

9. A circuit to be regulated and a voltage regulator therefor, said regulator including a rheostat connected in the circuit, a motor for operating the rheostat to vary the resistance thereof, a shunt circuit around the armature of said motor and a contact member vibrating in response to voltage variations in said circuit to regulate said shunt circuit around the motor armature and thereby control the resistance of said rheostat.

10. In a system of electrical regulation, in combination, a circuit to be regulated, a variable resistance in said circuit, a motor for operating said variable resistance, a shunt circuit around the motor armature, separable contacts in said shunt circuit adapted to vibrate rapidly to control the energization of said armature, and a voltage responsive winding connected across the circuit to be regulated, for controlling said vibrations and, hence, for controlling the resistance interposed in said circuit to offset the voltage variations.

11. An electric regulator comprising a variable resistance, a plurality of electromagnetic windings which by electrical reaction act to vary said resistance, a shunt circuit adapted to be closed around some of said windings, a vibrating contact controlling said shunt circuit and an electromagnetic coil controlling the operation of said contact whereby the reaction of said windings may be regulated.

12. In a system of electrical regulation, in combination, a circuit to be regulated, a variable resistance in said circuit, interacting electromagnetic coils controlling said resistance, a shunt circuit around one of said coils, separable contacts in said shunt circuit adapted to vibrate rapidly to control the energization of said winding and means responsive to the voltage across the circuit to be regulated for controlling said separable contacts.

In witness whereof, I have hereunto subscribed my name in the presence of two witnesses.

WILLIAM L. BLISS.

Witnesses:
WM. A. TURBAYNE,
F. J. CALLOHAN.